Jan. 23, 1934.　　　　S. RUPPEL　　　　1,944,846
CONTROL SYSTEM
Filed Jan. 10, 1930　　　4 Sheets-Sheet 1

Inventor:
Sigwart Ruppel,
by Charl V. Tulla
His Attorney.

Jan. 23, 1934.            S. RUPPEL            1,944,846
CONTROL SYSTEM
Filed Jan. 10, 1930            4 Sheets-Sheet 2

Inventor:
Sigwart Ruppel,
by Charles V. Tullar
His Attorney.

Jan. 23, 1934.   S. RUPPEL   1,944,846
CONTROL SYSTEM
Filed Jan. 10, 1930   4 Sheets-Sheet 3
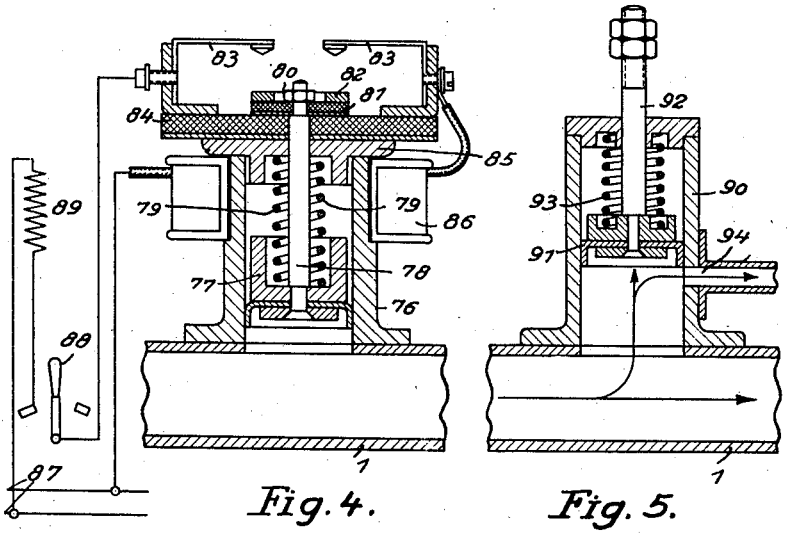
Fig. 4.   Fig. 5.
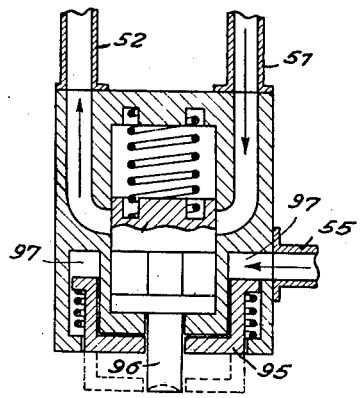
Fig. 6.
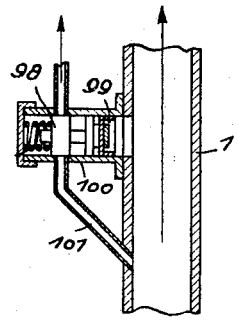
Fig. 7.
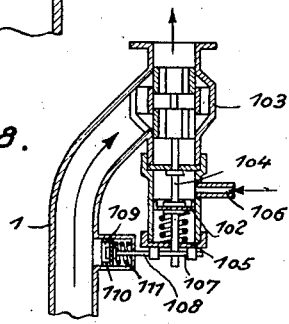
Fig. 8.
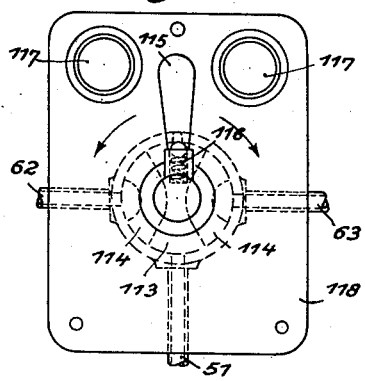
Fig. 9.
Fig. 10.
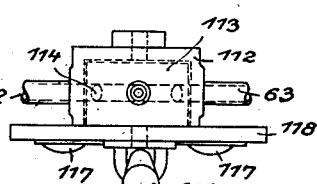
Inventor:
Sigwart Ruppel
By Pennie Davis Marvin + Edmonds
attorneys Jan. 23, 1934.                S. RUPPEL                 1,944,846
                            CONTROL SYSTEM
                         Filed Jan. 10, 1930           4 Sheets-Sheet 4
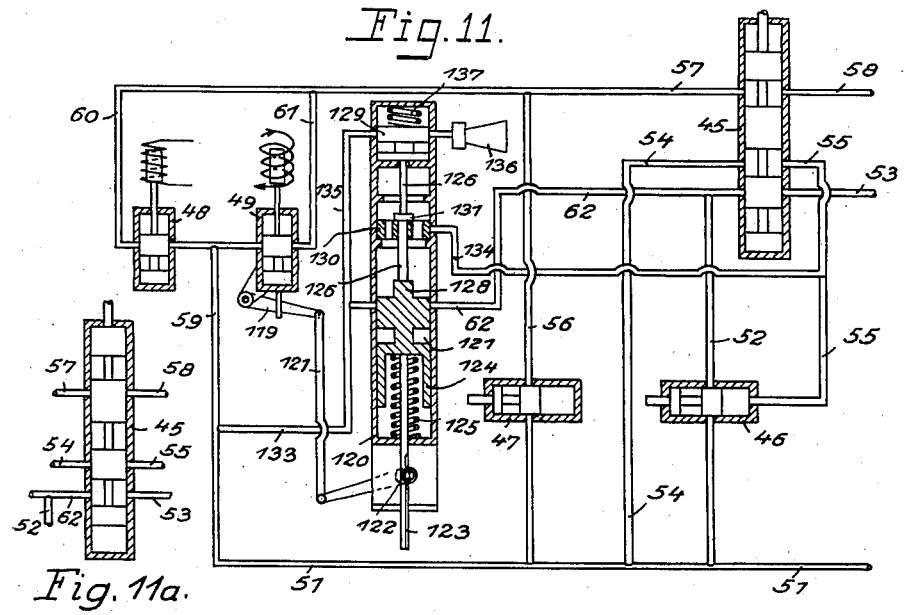
Fig. 11.
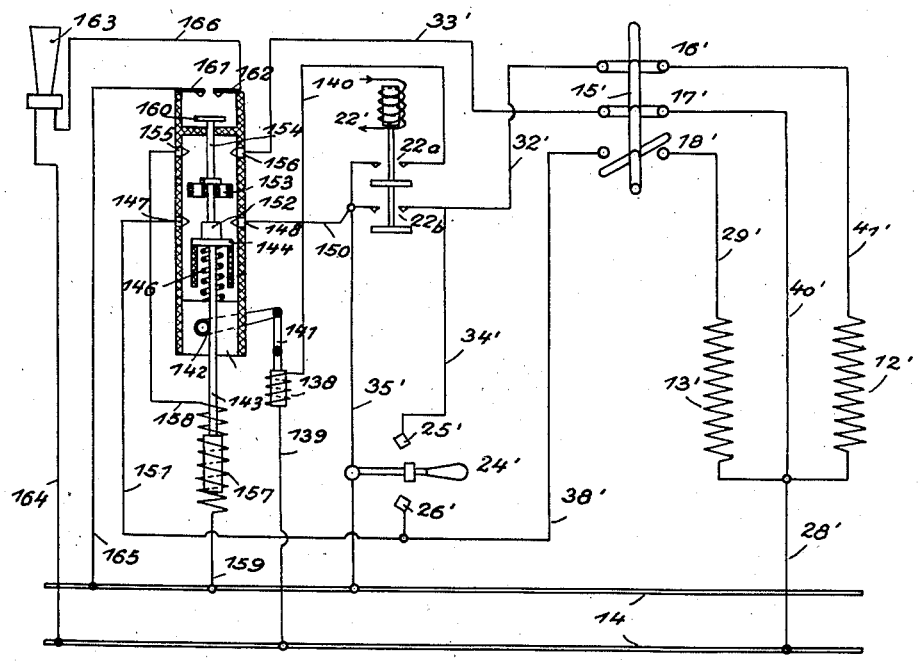
Fig. 11a.
Fig. 12.
Inventor:
Sigwart Ruppel
By
Pennie Davis Marvin & Edmonds
attorneys Patented Jan. 23, 1934

1,944,846

UNITED STATES PATENT OFFICE 1,944,846

CONTROL SYSTEM

Sigwart Ruppel, Frankfort-on-the-Main, Germany

Application January 10, 1930, Serial No. 419,862, and in Germany January 18, 1929

15 Claims. (Cl. 175—294)

The present invention relates to electric power generating stations, sub-stations and the like. More specifically, it relates to switch plants for such stations, particularly switch plants of the so-called gas-blast or pressure gas type, and has for its object the provision of an improved form of pressure gas switch control apparatus of simple and rugged construction and capable of efficient and reliable operation.

Within comparatively recent times and concomitant with various developments and improvements in apparatus of this general character, there has been an increasing tendency to employ pressure gas switches instead of oil switches in the construction of switch plants for electrical generating stations, sub-stations, and similar establishments for the generation and control of electric power, the contention being that pressure gas switches, in relying on a stream of high pressure gas to extinguish the switch arc, possess manifold advantages over oil switches. One form of such a pressure gas switch plant is described in my co-pending application, Serial No. 353,239, filed April 6, 1929.

Apart from the numerous operating and structural advantages of pressure gas switch plants, however, I have found that in the practical application of such switch plants, as for instance the one disclosed in my above mentioned application, the problem of providing suitable control apparatus furnishes considerable difficulty.

The value of any switching apparatus lies in its ability to act as a switch at the proper time and in the proper manner. Similarly, the value of control apparatus lies in its ability to effect control of the switches in the manner intended. If for any reason the control apparatus does not effect the regulation desired, any number of undesirable conditions may occur as a consequence.

In the case of pressure gas switches, the expedient which is perhaps the first to suggest itself, and which is without doubt the simplest, is the direct control of the connecting and disconnecting valves governing the supply of pressure gas to each switch. At first glance it would seem that such control could be readily effected, but when it is remembered that in the great majority of switch installations these valves would not be so placed as to be readily available for direct manipulation, or would be of such number as to make rapid and efficient direct control impracticable, it can be appreciated that some other form of control system is necessary.

The alternative, a remote control system, accordingly comes to mind, but while it eliminates some of the disadvantages resulting with direct control it raises a number of additional problems that require consideration. Thus, the connecting and disconnecting valves of the switches may be remotely controlled by pneumatic means, by electro-pneumatic means, or entirely by electrical means. In each case, however, it must be remembered that the proper operation of the switches depends on the proper supply of pressure gas, and that when such supply becomes deficient for any reason actuation of the control apparatus should be made impossible or ineffective. Moreover, the control system should be so devised that simultaneous actuation of the members controlling the connecting and disconnecting valves either is prevented or results in but one of the operations taking place, that is, either connection or disconnection of the switch. In addition, the control apparatus should be such that oscillation of the switches between connection and disconnection during short circuiting is effectively prevented.

In order to fulfill as far as is practically possible the various conditions and requirements mentioned above as essential to the satisfactory operation of a remote control system, I have devised the present invention, the important characteristic of which is the provision of reliable and efficient means for properly and safely controlling a pressure gas switch installation.

Generally speaking, my invention concerns the provision of suitable means for remotely controlling the operation of the connecting and disconnecting valves of a pressure gas switch, and additional means, governed by the supply of pressure gas to the switch, for controlling the operation of the remote control means. Preferably, the arrangement is such that when the supply of pressure gas falls below a predetermined pressure, operation of the switches is prevented.

In accordance with the invention, the remote control of the connecting and disconnecting valves of the pressure gas switches is effected pneumatically, electro-pneumatically or electrically. If control is to be effected pneumatically, the connecting and disconnecting valves may be provided with a spring loaded operating piston on which pressure gas from the supply mains may be caused to operate. On the other hand, if an electropneumatic type of control system is preferred, as may be the case in some installations, the parts of the control system located nearer the switches may be actuated pneumatically and the operation of these parts effected electrically through suitable apparatus located at a more remote point. Lastly, in providing an entirely electrical control system, the connecting and disconnecting valves may be actuated by electromagnetic means energized by current supplied from a suitable source over various control contacts.

Furthermore, to prevent the operation of the connecting and disconnecting valves when a sufficient supply of pressure gas is not available for their proper manipulation, provision may be made, in accordance with the invention, for rendering the control system ineffective, irrespective of whether pneumatic means, electro-pneumatic means or electrical means are employed. According to one embodiment of the invention, this dependence of the control system on the supply of pressure gas may be effected by providing a master valve or switch controlled by the pressure in the gas supply mains and controlling the actuation of the members of the control system, either by controlling the supply of current or of pressure gas thereto.

In order that the invention may be better understood, reference is made to the accompanying drawings, which, together with the description relating thereto, serve to illustrate by way of example several embodiments of the invention.

In the drawings,

Fig. 4 is a sectional view on a larger scale of a master control switch for use with the system shown in Fig. 1.

Fig. 5 is a sectional view on a larger scale of a master control valve for use with the systems shown in Figs. 1 and 2.

Fig. 6 is a sectional view of an enlarged scale of a modification of a detail shown in Fig. 2.

Fig. 7 is a sectional view on an enlarged scale of a modification of the master control valve shown in Fig. 5.

Fig. 8 is a sectional view on an enlarged scale of a pressure dependent interlocking valve.

Figs. 9 and 10 are front and top views on an enlarged scale of a detail shown in Fig. 2.

Fig. 11 is a diagrammatic representation on an enlarged scale of a reconnecting device for use with the systems shown in Figs. 2 and 3.

Fig. 11a is a sectional view of a detail shown in Fig. 11.

Fig. 12 is a diagrammatic representation on an enlarged scale of a reconnecting device for use with the system shown in Fig. 1.

Figure 1:
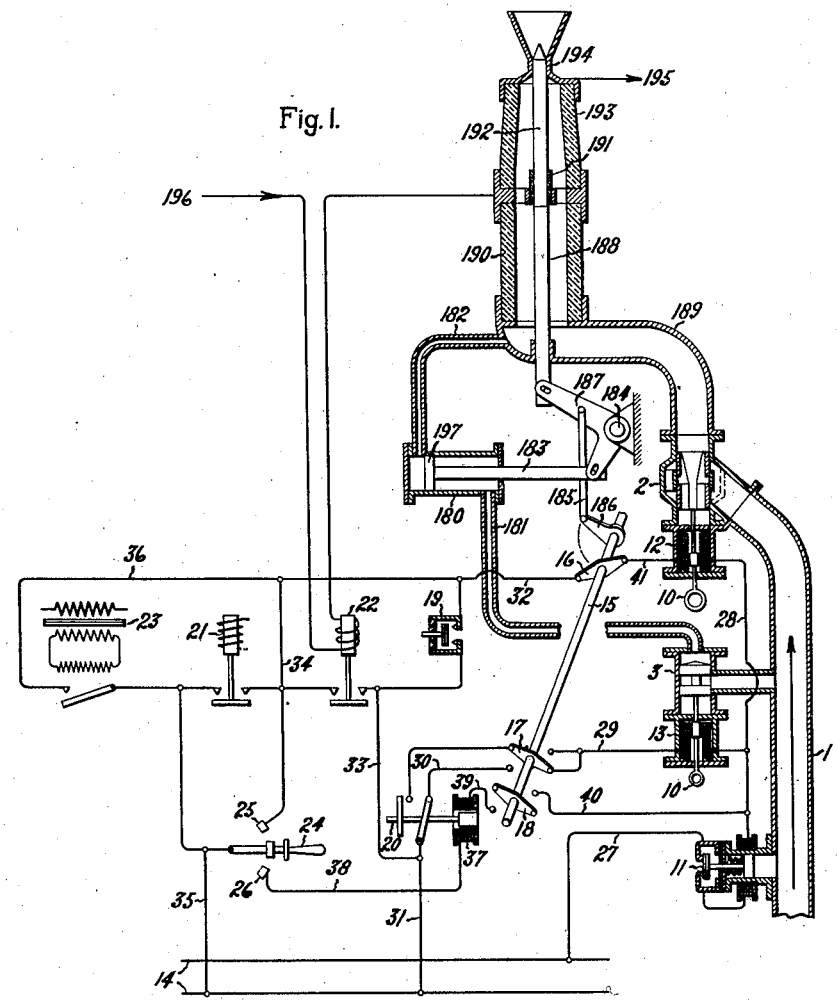
Fig. 1 is a diagrammatic representation of an electrical control system for a switch of the gas-blast type.

Considering more in detail the embodiments of the invention shown in the drawings, Fig. 1 represents diagrammatically an electrical control system wherein a representative pressure gas supply main 1 is connected to characteristic disconnecting and connecting valves 2 and 3, respectively, controlling the supply of pressure gas to a gas blast switch hereinafter described. A gas-blast switch of the character in question is disclosed and claimed in my co-pending application Serial No. 217,438, filed September 3, 1927 for method and apparatus for interrupting high tension circuits. Both the valve 2 and the valve 3 are provided with electromagnetic actuating means 12 and 13, respectively, and also with means 10 permitting hand operation in the event the electromagnetic means fail to operate.

Likewise connected to the supply main 1, but ahead of the valves 2 and 3, is a master control switch 11, provided with suitable contacts controlled by a piston subjected to the pressure in the main, as will be subsequently described. Over the contacts of this switch are closed all of the control circuits of the elements of the system from the source of current 14.

In series with the master switch 11, is arranged a gang switch 15, provided with three sets of contacts 16, 17 and 18 and adapted to be controlled by the movement of the pressure gas switch whose operation is to be controlled. In the drawings, this control of the switch 15 by the pressure gas switch is shown by way of example, as being effected by a simple form of mechanical connection. Accordingly, the gang switch 15 is caused to change its position each time the position of the pressure gas switch is changed. The particular position of the switch 15 shown in Fig. 1 corresponds to the disconnected position of the pressure gas switch.

Referring more particularly to the gas-blast switch, the same is connected by a gas conduit 189 to the valve 2 and comprises a pair of hollow insulating shells 190 and 193 joined together by an intermediate conducting flange 191 serving as one terminal of the switch. The switch electrodes comprise a stationary nozzle-like contact 194 of conducting material forming the other terminal of the switch to which the main circuit conductor 195 is connected. The movable electrode comprises a conducting rod member 192 arranged to engage the nozzle contact 194 and in sliding conducting engagement with the terminal at 191. Actuation of the movable electrode is effected by an insulating rod 188 secured thereto suitably connected to one arm 187 of a bellcrank 184 having a fixed pivotal mounting. Rotation of the bellcrank 184 in opposite directions is effective to cause reciprocal movement of the electrode 192 and engagement and disengagement of the electrode structure.

A pneumatic operator for the switch controlled by the valve 2 comprises a cylinder 180 in which a piston 197 is arranged for reciprocal movement, the piston rod 183 being suitably connected to the other arm of the bellcrank 184. One end of the cylinder 180 is connected by the pipe 182 to the gas conduit 189, and the other end of the cylinder is connected by a pipe 181 to the switch closing valve 3. Accordingly, opening of the valve 2 to admit gas under pressure to the conduit 189 causes actuation of the piston 197 in a direction to effect the opening movement of the rod electrode and also to effect a circuit interrupting blast of gas through the switch by way of the nozzle contact 194. Likewise with the switch in the open disconnecting position, opening of the valve 3 to admit gas from the main 1 to the other side of the cylinder causes movement of the piston 197 to the closed position illustrated.

The connection between the gas-blast switch and the gang switch 15, above referred to, may comprise a link 185 connected to the arm 187 of the bellcrank at one end and at its other end to an arm 186 connected to the rotatable shaft of the gang switch, the detailed operation of which will be hereinafter described.

In addition to the switches 11 and 15, the control system includes a push button switch 19, a throw-over switch 20, a minimum current relay 21, a maximum current relay 22, a low voltage relay 23 and a remote control switch 24 having contacts 25 and 26. For purposes of simplicity, the energizing circuits for the relays 21 and 23 have been omitted, it being understood, of course, that they would be connected in the circuit controlled by the pressure gas switch whose operation is to be regulated by the present system. The circuit of the relay 22 is included in the main circuit to be controlled, the coil of the relay 22 being in series with the line conductor 196 connected to one terminal of the switch. Assuming that it is desired to close the pressure gas switch, the plunger of the throw-over switch 20 is pressed in to the position shown, whereupon the energizing circuit for the electromagnetic means 13 of the valve 3 is completed and the valve 3 is operated to supply pressure gas to the operating piston 197 of the pressure gas switch, which effects a connecting movement in consequence. Beginning with one side of the line 14, the circuit thus closed by the pressing of the switch 20 includes lead 27, the contacts and coil of the switch 11, lead 28, actuating coil 13 of the valve 3, lead 29, contacts 17 of switch 15, lead 30, the inner contact of switch 20 and lead 31.

As soon as the pressure gas switch has been connected, the switch 15, by virtue of its attachment to the pressure gas switch, is actuated and thrown over, whereupon contacts 16 are closed and contacts 17 and 18 are moved to a new position and broken respectively. The energizing circuit of the valve 3 accordingly is broken and the valve closed since the throw-over switch remains in the position shown in Fig. 1 until again actuated.

When the pressure gas switch is to be disconnected, the push button 19 is pressed, with the result that the circuit of the actuating coil 12 of the valve 2 is closed, the valve is opened and pressure gas is supplied to the operating piston 197 to disconnect the pressure gas switch and to direct a circuit interrupting blast of gas to the switch. In this instance, the circuit includes lead 27, the contacts and coil of switch 11, lead 28, actuating coil 12 of valve 2, lead 41, contacts 16 of switch 15, lead 32, push button switch 19, lead 33 and lead 31.

When the disconnecting movement of the pressure gas switch has been completed, the switch 15 is operated accordingly and brought back to its original disconnecting position, opening the previously closed contacts 16 and closing contact 18. The circuit of the actuating coil 12 of the valve 2 thereupon is broken and the valve closed. The apparatus is now again in position for effecting a connecting movement of the pressure gas switch.

The movable contact of the switch 17 of the gang switch is arranged on its operating shaft so that it is actuated only upon closing of the gas-blast breaker. In other words, the contact is rotated upon clockwise rotation of the gang switch shaft but is not affected by counterclockwise rotation. Therefore, by arranging the stationary contacts so that at least one pair is engaged each time the movable contact is advanced clockwise about 90 degrees, the switch 17 may function in the manner desired. For the purpose of simplifying the drawings no special coupling between the movable contact of switch 17 and its operating shaft is shown, such a connection, as a ratchet connection for example, being well known and obvious to those skilled in the art.

The movable contacts of the switches 16 and 18, however, are keyed to the gang switch operating shaft and are actuated upon each opening and closing operation of the main switch.

The connection between the gas-blast switch and the operating shaft of gang switch 15 is preferably such that said shaft is actuated only near the end of the switch opening or closing stroke. This may readily be accomplished by a loose coupling for example between the arm 186 and the shaft comprising stop members on the shaft allowing limited movement of the arm 186. By this arrangement there is no danger that the magnet coil 12 of the interrupting valve 2 may be deenergized at the beginning of the switch opening stroke by the contacts of the switch 16. In the event of premature deenergization of the magnet coil 12 and consequent closing of the valve 2, an insufficient supply of compressed gas may be admitted to the switch. The same applies to the closing operation, since the switch electrodes should be closed positively in order to prevent burning.

The preceding explanation of the steps for effecting disconnection of the pressure gas switch dealt only with the manual control provided by the push button 19. By means of the relays 21, 22 and 23 the same operation may be effected automatically should the conditions for which the relays are designed occur. Thus, should the current of the line controlled by the pressure gas switch increase beyond a given value, the relay 22 will be energized to close its contacts, whereupon the circuit of the actuating coil 12 of the valve 2 will be closed and the valve operated to effect disconnection, the circuit in this case branching from the contacts 16 of the switch 15, by way of lead 32, lead 34, the contacts of the relay 22, lead 33 and lead 31.

Likewise, should the conditions for which the relay 21 is designed occur, its contacts will be closed and the circuit of the actuating coil 12 of the valve 2 completed by way of lead 35, lead 34 and lead 32 to the contacts 16. A similar effect will be produced upon the actuation of relay 23, except in this instance the circuit of the coil 12 of the valve 2 will branch from lead 35 over the contacts of relay 23 to lead 36 and thus to lead 32 and the contacts 16.

Should the circumstances be such that control by means of the throw-over switch 20 or the push button switch 19 is inconvenient, the same operations may be performed from a remote point by means of the switch 24. Thus, if connection is to be effected the switch handle is moved to the contact 26, thereby closing the circuit of actuating coil 37 of the switch 20 through the switch 18 and causing the plunger of the latter to move inward and close the circuit of the actuating coil 13 of the valve 3. The circuit for the coil 37 includes lead 35, contact lead 38, coil 37, lead 39, contacts 18, lead 40 the coil and contacts of switch 11 and lead 27. When the gas-blast switch is closed, switch 18 is open so that the closing coil is automatically deenergized. On the other hand, if disconnection is to be effected the handle of the switch 24 is moved to the contact 25, thereby closing the circuit of the actuating coil 12 of the valve 2 directly through lead 35, contact 25, lead 34, lead 32, contact 16, lead 41, coil 12, lead 28, the coil and contacts of switch 11 and lead 27.

Irrespective of which means are used to effect actuation of the valves 2 and 3, whether it be the relays 21, 22 and 23, the push button 19, the throw-over switch 20, or the remote control switch 24, the energizing circuit for the actuating coils of the valves always includes the contacts of the master switch 11, controlled by the pressure in the supply main 1. So long as the pressure in the main does not fall below the predetermined value for which this switch 11 is set, as will be subsequently described, its contacts remain closed and closure of the circuits in question consequently can be effected. However, should the pressure drop below the predetermined value the contacts of the switch 11 will be opened and no actuation of the valves 2 and 3 will be possible by the control system.

Figure 2:
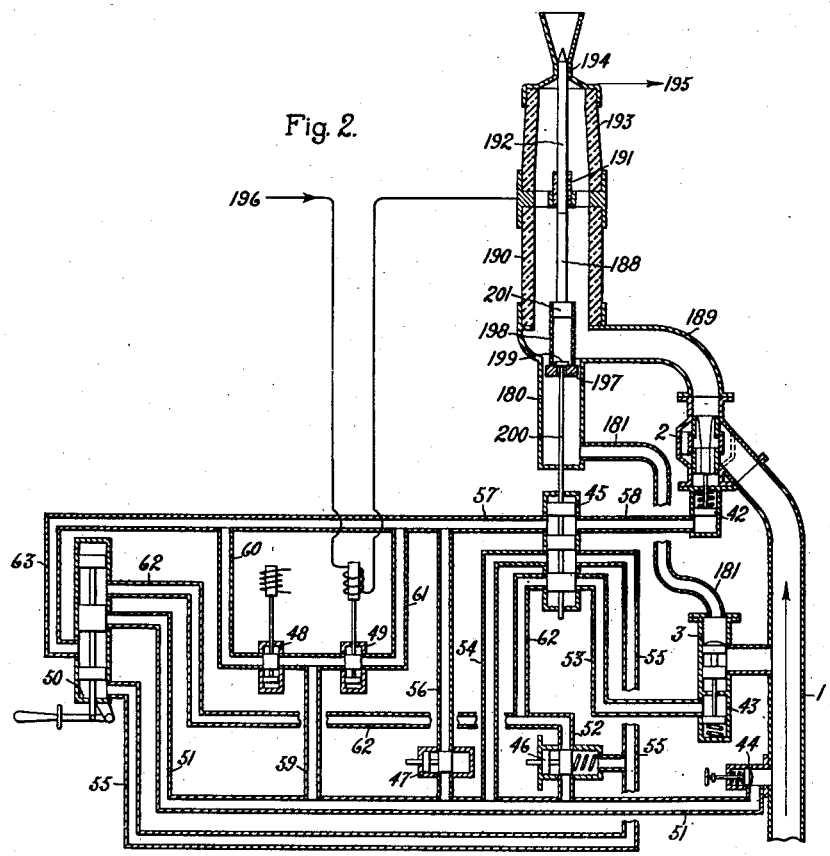
Fig. 2 is a diagrammatic representation of a pneumatic control system.

Fig. 2 illustrates diagrammatically a control system including a gas-blast switch wherein the actuation of the valves 2 and 3 connected to the pressure gas supply main 1 is effected pneumatically. In this arrangement, the valves 2 and 3 are provided with spring cushioned pistons 42 and 43, respectively, operating in suitable cylinders to which pressure gas is supplied as desired. In addition, a pneumatically operated master control valve 44, corresponding in function to the master switch 11 shown in Fig. 1, is connected to the supply main 1 at a point ahead of the valves 2 and 3. As will subsequently appear, all of the pressure gas used to operate the various elements of the control system is bled from the main 1 through the valve 44.

The gas-blast switch shown in Fig. 2 is the same as shown in Fig. 1, the pneumatic operator being simplified to some extent. A detailed general description is unnecessary as similar reference numerals have been applied to designate corresponding elements of the switch shown in Fig. 1.

The switch operating piston 197 in the present instance is directly connected by a tubular member 198 to a portion 201 forming the lower extremity of the actuating rod 188. The slide rod 200, for a purpose hereinafter described, is slidably mounted within the cylinder 180 and is provided at its upper end with a stop member 199 positioned within the tube 198. The rod 200 is slidable with respect to the piston 197 so that a certain lost motion is provided between the movable switch electrode and the rod 200.

In general, the arrangement shown in Fig. 2, corresponds to that shown in Fig. 1, in that the various pneumatically actuated elements employed are the counterparts of the electrically actuated elements described in connection with the previous figure. Thus, in the system of Fig. 2 is provided a gang slide valve 45 having an actuating rod 200 adapted to be controlled by the movement of the pressure gas switch, a push button slide valve 46, corresponding to the switch 20 of Fig. 1 and controlling the supply of pressure gas to the valve 3, and a push button valve 47, corresponding to the push button 19 of Fig. 1 and controlling the supply of pressure gas to the valve 2. In addition, the conduit for supplying pressure gas to the disconnecting valve 2 is equipped with a minimum voltage relay valve 48 and a maximum voltage relay valve 49 corresponding to the relays 21 and 22 of Fig. 1. To permit of remote control in a manner similar to that obtained with the remote control switch 24 of Fig. 1, the system is provided with a remote control slide valve 50, so adapted as to be locked in any one of its operating positions. As in Fig. 1, the energizing winding for the valve 48 and the connection between the gang valve 45 and the pressure gas switch are shown diagrammatically, valve 49 being energized by a coil connected in the circuit to be controlled.

Assuming that with the system in the disconnected position it is desired to effect closing of the pressure gas switch to the position shown, the valve 46 is pressed open whereupon pressure gas from the main 1, admitted to conduit 51 by the master valve 44, passes into conduit 52, through gang valve 45 into conduit 53 and thence to the operating piston 43 of connecting valve 3, which thereupon is opened.

When connection of the pressure gas switch has been completed, the gang valve 45 is operated to close conduits 52 and 53 and open conduit 54 to permit passage of pressure gas therethrough from conduit 51 into conduit 55 communicating with the rear of the valve 46. The supply of pressure gas to the piston 43 thereby is cut off and, further, the valve 46 is forced to its closed position to make doubly sure that such cut off is complete. As long as the pressure gas switch is in its connected position, it therefore is impossible to actuate the connecting valve 3.

If disconnection is now to be effected, the valve 47 is pressed open, thereby permitting the passage of pressure gas from conduit 51 into conduit 56, into conduit 57, through gang valve 45 into conduit 58 and thence to piston 42 of valve 2. The valve 2 accordingly is operated and disconnection is effected, and at the conclusion of disconnection the apparatus is once more in the position shown in Fig. 1, ready for the manipulation of the valve 46 for effecting connection. By reason of the lost-motion connection between the movable electrode of the gas-blast switch and the gang valve 45, premature closing of the valves 2 and 3 is prevented as in the case of Fig. 1.

As in the case of the relays 21 and 22 of Fig. 1, the relay valves 48 and 49 provide for automatic operation of the disconnecting valve 2 in the event of abnormal conditions occurring in the line controlled by the pressure gas switch, both valves being adapted to open under predetermined conditions to permit the flow of pressure gas from conduit 51 into conduit 59 and thence either through conduit 60 or 61 into conduit 57 leading to gang valve 45 and piston 42.

The valves 2 and 3 may also be operated by means of the remote control valve 50. If for instance, it is desired to operate the connecting valve 3, the remote control valve 50 is moved into position where pressure gas supplied through conduit 51 passes into conduit 62 and from thence through gang valve 45 into conduit 53 and to the piston 43. As soon as the gang valve 45 is operated to close this supply, communication between conduits 54 and 55 is established and pressure gas supplied to the rear of valve 50 through an extension of the conduit 55 to move that valve back to its original position closing conduit 51. At the same time, gang valve 45 establishes communication between conduits 57 and 58, so that when valve 50 is subsequently moved to effect disconnection, pressure gas entering through conduit 51 passes into conduit 63 and thence through conduit 57 and gang valve 45 to the piston 42 of valve 2.

Figure 3:
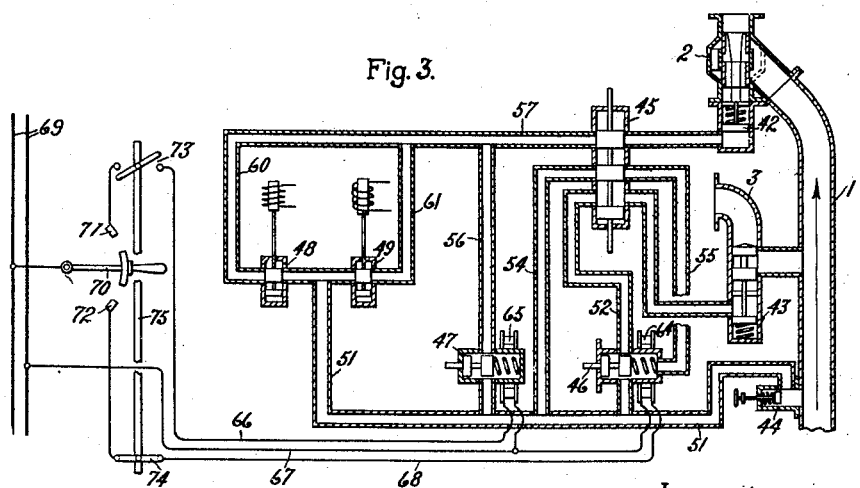
Fig. 3 is a diagrammatic representation of an electro-pneumatic control system.

Fig. 3 illustrates a control system wherein certain of the features of both Fig. 1 and Fig. 2 are combined to provide an electro-pneumatic system, the apparatus adjacent the connecting and disconnecting valves being adapted for pneumatic actuation and remote control being effected electrically. As those portions of the system of Fig. 3 shown in Figs. 1 and 2 function in the manner already described it is not thought necessary to undertake any further description of them here, except to point out that corresponding elements have been designated by the same reference characters.

The distinction between the valves 46 and 47 of Fig. 3 and the valves 46 and 47 of Fig. 2 lies in the former being equipped with actuating coils 64 and 65, respectively. adapted to be supplied with electric current from source 69 by means of leads 66, 67 and 68 and remote control switch 70 having contacts 71 and 72. In the circuit of leads 66 and 68 are arranged contacts 73 and 74, respectively, of a tandem switch 75 adapted to be controlled by the movement of the pressure gas switch in the same manner as the gang switch 15 of Fig. 1.

When connection is to be effected with this arrangement, the switch 70 is moved to the contact 72, whereupon current is supplied to the coil 64 and the valve 46 is operated. As soon as the sequence of operations resulting from the actuation of the valve 46 has been completed, the switch 75 is operated by the pressure gas switch and the circuit of the coil 64 broken at 74, contact 73 being closed at the same time. On subsequently moving the switch 70 to the contact 71, the circuit of coil 65 is closed, causing disconnecting valve 47 to be operated, and when the disconnection is complete this circuit is broken in turn by the movement of the switch 75 opening the contact 73. In either position of the switch 70, further energization of the coils 64 and 65, after the valves 2 and 3 have once been operated, is prevented by the opening of the coil circuits at the contacts 73 and 74.

Fig. 4 illustrates in greater detail the master control switch 11 used in connection with the system shown in Fig. 1. On the pressure gas supply main 1 is mounted a cylinder 76, in which is disposed a piston 77 carried by a rod 78 and spring loaded at 79. By means of adjusting nut 80 the compression of the spring 79 is adjusted to suit the particular pressure to be maintained in the main 1.

On the upper end of the rod 78 is secured an insulating cap 81 provided with contact ring 82 adapted to co-operate with control system contact members 83 mounted on an insulating cover 84 surmounting cylinder cover 85. When the pressure in the main 1 is of the desired value, the spring 79, adjusted accordingly, permits the piston to be moved upwardly to close the contacts 83 by means of the ring 82. As long as the pressure in the main remains at the desired value the contacts 83 are held closed and the control system is supplied with current from the source 14 of Fig. 1, but as soon as the pressure drops the piston moves downward and the contacts are opened.

Under some conditions it may be desirable to prevent opening of the contacts due to momentary fluctuations in the pressure in the mains. For this purpose, the switch may be provided with a locking coil 86 in series with the contacts 83 and connected to a suitable source of current 87, by means of a switch 88. If desired, this switch 88 may be constituted by the switch 24 of Fig. 1, in which case the circuit of the coil 86 includes a coil 89, which may be the actuating coil of either the connecting or the disconnecting valve. In most instances it would be preferable to have the circuit of the coil 86 closed when disconnection is to be effected and in that case the coil 89 would be constituted by the actuating coil 12 of the valve 2.

Fig. 5 illustrates in detail one form which the pneumatic master control valve 44 of Figs. 2 and 3 may take. In this arrangement a closed ended cylinder 90 mounted on the main 1 is provided with a piston 91 carried on a rod 92 and movable in the cylinder against the action of a spring 93. The spring is so adjusted that the piston will be held up in the cylinder sufficiently far, when the pressure in the main 1 is of the desired value, to uncover port 94 opening into the conduit for supplying pressure gas to the control system. As is evident from the figure, the uncovering of the port 94 depends entirely on the pressure maintained in the main 1. If such pressure drops below the value for which the valve is set, the port is closed by the descent of the piston and the supply of pressure gas to the system cut off.

In Fig. 6 is illustrated a modification of the push button control valve 46 shown in Fig. 2. In Fig. 2, as previously described, the holding down of the push button after connection of the pressure gas switch has been achieved, is prevented by the inflow of pressure gas to the rear of the valve through the conduit 55. In Fig. 6, on the other hand, the same effect is obtained in a somewhat different manner. In this instance, the valve body is provided with a spring loaded cover or guard 95 surrounding the push button 96. This guard 95 is slidable in a recess 97 in the valve body to which is connected the conduit 55 of Fig. 2. Accordingly, when the push button 96 is pressed inward to effect connection of the pressure gas switch and such connection is achieved, the movement of the gang valve 45 of Fig. 2 results in the supply of pressure gas to the conduit 55. The entrance of the gas into the recess 97 forces the guard 95 outward into the position shown in dotted lines and thus prevents the continued depression of the push button 96 by an operator.

A modification of the master control valve shown in Fig. 5 is shown in Fig. 7. In this instance, the opening and closing of the bleeder conduit for supplying pressure gas to the control system is effected by a valve block 98 carried by a piston 99 movable in a cylinder 100 under the pressure of the gas in the main 1. Further, the bleeding of the pressure gas from the main is not effected through the valve cylinder directly but through a conduit 101 branching from the main 1 at some distance from the point where the valve cylinder 100 is attached.

Fig. 8 illustrates an arrangement wherein the disconnecting valve is interlocked with pressure responsive means in such a manner that the valve can only be operated when sufficient pressure exists in the supply mains. In the figure, the spring loaded actuating piston 102 of the valve 103 is mounted on a piston rod 104 extending through the end of the cylinder 105 to which pressure gas is supplied from the control system through conduit 106. The end of the piston rod 104 is connected by means of interlocking mechanism 107 to rod 108 controlled by piston 109 operating in cylinder 110 under the pressure of the gas in the main 1. The arrangement of the interlocking mechanism is such that the piston 102 mounted on the rod 104 can only be moved downwardly, under the influence of pressure gas admitted through conduit 106, to open the valve 103 so long as the pressure in the main 1 is sufficient to keep the piston 109 in its extended position. As soon as the pressure falls below the value for which the spring 111 is adjusted, the piston 109 is retracted and the rod 104 held against movement.

Figs. 9 and 10 illustrate in greater detail a form of the remote control slide valve 50 employed in the system of Fig. 2. As shown in the figures, the conduits 51, 62 and 63 terminate in a cylindrical valve chamber 112 in which a tightly fitting valve plug 113 having connecting passages 114 is adapted to be turned by means of handle 115. To ensure the secure closing of the valve, that is, the cutting off of all communication of the conduit 51 with either of the conduits 62 or 63, the handle 115 may be provided with means such as 116 for locking it in its neutral position. Also, if desired, signal lights 117 may be provided on the front of the valve supporting panel 118 to indicate the position of the valve.

Under certain conditions, as for instance when the pressure gas switch has been disconnected through the occurrence of abnormal conditions on the line, it may be desirable to reconnect the switch upon the expiration of a given period of time after its disconnection. Apparatus for accomplishing this purpose is illustrated in Figs. 11 and 12, the former relating to a pneumatic system such as that shown in Figs. 2 and 3, and the latter to an electrical system of the type illustrated in Fig. 1. For purposes of simplicity in illustration and description, the portions of the systems of Figs. 1, 2 and 3 incorporated in Figs. 11 and 12 have been designated by the same reference characters. It is believed that by so doing the environment of the reconnecting apparatus can be more readily understood.

Considering Fig. 11, it should be noted first that the gang valve 45 is shown in the position occupied by it when the pressure gas switch is connected. Assuming now that some condition occurs on the line which results in the opening of the relay valve 49, pressure gas supplied through conduits 51 and 59 passes into conduit 61 and from there through conduit 57 and valve 45 to conduit 58 leading to the disconnecting valve 2 (not shown). The pressure gas switch accordingly is disconnected and the gang valve 45 moved to the position shown in Fig. 11a.

However, the relay valve 49 is mechanically coupled to a reconnecting valve 120 by means of a lever 119, rod 121 and escapement 122 in such a manner that the movement of the valve 49 on opening releases the escapement 122 and permits rod 123 carrying valve block 124 to be moved upward at a predetermined rate under the action of a spring 125. The valve block 124 is slidably centered on rod 126 and provided with an annular passage 127 and a boss 128. The rod 126, on the other hand, is secured to a valve block 129 and carries a slidable valve block 130 held in position by a shoulder 131 on the rod and abutments formed as illustrated on the inner sides of the casing of the valve 120.

Accordingly, as the valve block 124 moves upwardly along the rod 126 it reaches a point where the passage 127 effects communication between a conduit 133, branching from the supply conduit 51, and the conduit 62 leading to the gang valve 45. Pressure gas from the conduit 51 therefore enters conduit 62, and, as the gang valve 45 is in the position shown in Fig. 11a, passes therefrom into the conduit 53 leading to the connecting valve 3 (not shown). The valve 3 is operated as a result and the gang valve 45 brought back to the position shown in Fig. 11. The pressure gas switch has thus been reconnected after the expiration of a period of time depending on the setting of the escapement 122.

At this stage of the reconnection, two cases are possible; either the abnormal condition causing the disconnection has been removed in the time which has elapsed, in which case the switch remains connected, or the condition is still existent and causes the immediate disconnection of the switch the moment connection is effected.

Considering the former case first, the valve block 124 continues its upward movement, cutting off communication between conduits 133 and 62, and eventually reaches the point where boss 128 engages valve block 130 and forces the latter, together with the rod 126 and valve block 129, upwardly until conduit 134 and conduit 135 are uncovered. Pressure gas admitted through conduits 51 and 133 accordingly passes from conduit 135 to siren 136 and causes its actuation. At the same time, pressure gas passing from conduit 134 (by way of conduit 51, conduit 54, gang valve 45 and conduit 55) enters the casing above the valve block 124 and forces it downward against the action of spring 125 until the rod 123 and escapement 122 are again latched in their starting position. This downward movement of the valve block 124 permits the rod 126, carrying valve blocks 129 and 130, to drop back under the action of spring 137, and with that the conduits 135 and 134 are closed.

When the second case obtains, that is, the repeated disconnection of the switch because of a continuation of the abnormal line condition, the movement of the valve blocks 124, 129 and 130 is the same as above described with the exception that no pressure gas enters through the conduit 134 to force the valve block 124 downward because the supply of pressure gas to the conduit is cut off by the gang valve 45, the latter being in the position shown in Fig. 11a so long as the switch is disconnected. Accordingly, the valve block 124 remains in its raised position and holds the valve block 129 up so that pressure gas can enter from conduit 135 and actuate the siren 136.

So long as the disturbance on the line continues the siren continues to sound, and therefore serves as an effective warning. When the disturbance has been eliminated, the switch can be reconnected by operating push button valve 46, as already explained. The gang valve 45 thereupon is moved into the position shown in Fig. 11 and pressure gas enters from the conduit 134 to force the valve block 124 downward to its starting position and permit the closing of the conduits 134 and 135 by the valve blocks 130 and 129.

To avoid unnecessary complication of the drawing, only the relay valve 49 has been illustrated in Fig. 11 as being provided with the connecting linkage 119—121. Obviously, the relay valve 48 would also be provided with similar means whereby the same procedure above described would ensue upon its actuation.

Fig. 12 illustrates a reconnecting apparatus which in function represents the electrical equivalent of the apparatus shown in Fig. 11. In this figure, the actuating coils of the disconnecting and connecting valves 2 and 3 are diagrammatically indicated at 12' and 13', respectively, and the gang switch at 15' controlling contacts 16', 17' and 18'. The illustrated position of the switch 15' corresponds to the connected position of the pressure gas switch.

Should a disturbance occur on the line resulting in the actuation of the relay 22', the contacts 22a and 22b will be closed and the circuit of the disconnecting valve coil 12' completed from the source 14 through lead 35', contact 22b, lead 32' and contact 16'. The valve thereupon will be operated and the switch 15' moved to its disconnected position along with the pressure gas switch, thus opening the contacts 16' and 17' and closing contact 18'. At the same time, the relay contacts 22a will be closed, completing the circuit of trip coil 138 by way of leads 139, 140 and 35'.

On actuation of the trip coil 138, its plunger 141 is retracted, thereby actuating escapement 142 associated with rod 143 carrying contact block 144 mounted for movement as illustrated within the reconnecting device. As in the construction described in connection with Fig. 11, the escapement 142 is such as to permit the regulated upward movement of the rod 143 and block 144 under the action of spring 146; the period of time required for such movement being variable by adjustment of the escapement.

As the block 144 moves upwardly, it first short circuits contacts 147 and 148 mounted in the casing and in so doing completes the circuit of the actuating coil 13' of the connecting valve, current being supplied from the source 14 through lead 35', lead 150, contacts 147 and 148, lead 151, lead 38' and gang switch contact 18'. The pressure gas switch accordingly is moved to its connected position and the gang switch 45 brought back to the position illustrated.

As in the arrangement previously described, it may be that when this stage is reached the disturbance either has been removed from the line and the connection of the switch maintained or is still in existence and therefore causes the immediate disconnection of the switch. In either case, the block 144 continues to move upward but the results of such movement are different, as will appear.

Assuming that the connection is maintained, the further upward movement of the block 144 causes the boss 152 thereon to engage a second contact block 153 mounted on rod 154, along which contact block 144 slides, and carry it upward. When the upward movement has proceeded to the point where the block 153 short circuits contacts 155 and 156, the circuit of actuating coil 157 is completed and the rod together with the blocks 144 and 153 drawn downward to the starting position. The completion of the circuit of the coil 157 is effected through lead 28', lead 40', contact 17', lead 33', contacts 155 and 156, lead 158 and lead 159.

On the other hand, if the pressure gas switch is immediately disconnected again because of the continuation of the line disturbance after the interval of time provided by the reconnecting device has elapsed, the short circuiting of the contacts 155—156 by the block 153 will not result in the coil 157 being energized because the contact 17' remains open so long as the switch is in its disconnected position. The rod 143 accordingly will not be retracted but instead will continue its upward movement until contact block 160 engages contacts 161 and 162 and in so doing closes the circuit of a siren or signal device 163 by way of lead 164, lead 165 and lead 166. The siren thereupon will sound and provide suitable warning of the continuation of the disturbance.

After the disturbance has been removed, the pressure gas switch can be reconnected by moving the control switch 24' to the contact 26', the circuit of the actuating coil 13' of the connecting switch being completed over the closed contact 18' of the switch 15'.

In consequence of such reconnection, the switch 15' will be operated to open contact 18' and close contacts 16' and 17', and thereupon the circuit of the actuating coil 157 will be closed across the contacts 155—156 by the raised block 153, and the rod 143, together with the blocks 144, 153 and 160, retracted to its starting position. In the end, the circuit of both the siren 163 and the actuating coil 157 will be opened and the device thus placed in readiness for further reconnecting operations.

I claim:—

1. A control system including a switch of the gas-blast type, operating means for said switch including a disconnecting valve arranged to be supplied with gas under pressure, said disconnecting valve operable to admit a circuit interrupting blast of gas to said switch, actuating means for said valve, and means responsive to the pressure of the gas supply for controlling the operation of said actuating means.

2. A control system including a switch of the gas-blast type, a connecting and a disconnecting valve arranged to be supplied with gas under pressure for operating said switch, said disconnecting valve admitting a blast of gas under pressure to said switch during the switch opening movement, actuating means for said valves, manually operable means for controlling the operation of said actuating means, and means responsive to the pressure of the gas supply determining the control of said manually operable means over said actuating means.

3. A control system including a switch of the gas-blast type, a connecting and a disconnecting valve arranged to be supplied with gas under pressure for operating said switch, actuating means associated with said valves, manually operable means for controlling the operation of said actuating means, means responsive to pressure of the gas supply determining the control of said manually operable means over said actuating means, and means dependent on the movement of said gas-blast switch for selectively controlling the operation of said actuating means.

4. A control system including a switch of the gas-blast type, means including a valve arranged to admit a circuit interrupting blast of gas to said switch, actuating means associated with said valve, manually operable means for controlling the operation of said actuating means, means responsive to pressure of the gas supply determining the control of said manually operable means over said actuating means, and means operated by said gas-blast switch for governing the control of said actuating means by said manually operable means.

5. A control system including a switch of the gas-blast type, a connecting and a disconnecting valve arranged to be supplied with gas under pressure for operating said switch, actuating means associated with said valves, manually operable means for controlling the operation of said actuating means, means responsive to pressure of the gas supply determining the control of said manually operable means over said actuating means, and means operated by said gas-blast switch for preventing the operation of either of said actuating means twice in succession.

6. A control system including a switch of the gas-blast type, a connecting and a disconnecting valve arranged to be supplied with gas under pressure for operating said switch, actuating means associated with said valves, manually operable means for controlling the operation of said actuating means, means responsive to pressure of the gas supply determining the control of said manually operable means over said actuating means, and means operated by said switch for controlling the operation of the disconnecting valve actuating means.

7. A control system including a switch of the gas-blast type, a connecting and a disconnecting valve arranged to be supplied with gas under pressure for operating said switch, actuating means associated with said valves, manually operable means for controlling the operation of said actuating means, means responsive to pressure of the gas supply determining the control of said manually operable means over said actuating means, and manually operable control devices adjacent said connecting and disconnecting valves and a manually operable control device remote from said valves included in said manually operable means, said remote control devices being adapted to control the actuation of said first-named devices.

8. A control system including a switch of the gas-blast type, a connecting and a disconnecting valve arranged to be supplied with gas under pressure for operating said switch, actuating means associated with said valves, manually operable means for controlling the operation of said actuating means, means responsive to pressure of the gas supply determining the control of said manually operable means over said actuating means, automatically operable means for effecting the operation of the actuating means associated with said disconnecting valve, and means controlled by said automatic means for effecting the operation of the actuating means associated with said connecting valve upon the expiration of a predetermined period of time after the operation of said disconnecting valve actuating means.

9. A control system including a switch of the gas-blast type, a connecting and a disconnecting valve arranged to be supplied with gas under pressure for operating said switch, actuating means associated with said valves, manually operable means for controlling the operation of said actuating means, means responsive to pressure of the gas supply determining the control of said manually operable means over said actuating means, automatic means for effecting the actuation of said connecting valve upon the expiration of a predetermined period of time after the actuation of said disconnecting valve, and a signal device, said automatic means being adapted to cause the operation of said signal if the actuation of said connecting valve is not effected.

10. A control system including a switch of the gas-blast type, a connecting and a disconnecting valve arranged to be supplied with gas under pressure for operating said switch, electromagnetic actuating means associated with each of said valves, a source of current, manually operable switches for controlling the supply of current from said source to said actuating means, means responsive to the pressure of the gas supply for governing the connection of said switches to said source, and a gang switch operated by said gas-blast switch for controlling the supply of current to said actuating means.

11. A control system including a switch of the gas-blast type, a connecting and a disconnecting valve arranged to be supplied with gas under pressure for operating said switch, pneumatically operable actuating means associated with each of said valves, manually operable means for controlling connection of said actuating means to the gas supply, means responsive to the pressure of said gas supply for governing the connection of said manually operable valves to said gas supply, and a gang valve operated by said gas-blast switch for controlling supply of gas to said actuating means.

12. A control system including a switch of the gas-blast type, a connecting and a disconnecting valve arranged to be supplied with gas under pressure for operating said switch, pneumatically operable actuating means associated with each of said valves, valves for controlling the connection of said actuating means to the gas supply, electromagnetic means for actuating said control valves, a source of current, a manually operable switch for controlling the supply of current from said source to said electromagnetic means, means responsive to pressure of the gas supply for governing the connection of said control valves to the pressure gas supply, and a gang valve operated by the gas-blast switch for controlling the supply of gas to said pneumatically operable actuating means.

13. A control system including a switch of the gas-blast type, a connecting and a disconnecting valve arranged to be supplied with gas under pressure for operating said switch, actuating means associated with said valves, manually operable means for controlling the operation of said actuating means, means responsive to the pressure of the gas supply determining the control of said manually operable means over said actuating means, and means for effecting the operation of the actuating means associated with one of said valves upon the expiration of a predetermined period of time after the operation of the actuating means associated with the other of said valves.

14. A control system including a switch of the gas-blast type, a connecting and a disconnecting valve arranged to be supplied with gas under pressure for operating said switch, electromagnetic actuating means associated with each of said valves, a source of current, manually operable switches for manually controlling the supply of current from said source to said actuating means, and means responsive to an abnormal pressure of the gas supply for controlling the connection of said actuating means to said source.

15. A control system including a switch of the gas-blast type, a connecting and a disconnecting valve arranged to be supplied with gas under pressure for operating said switch, pneumatically operable actuating means associated with each of said valves, manually operated valves for controlling the connection of said actuating means to the gas supply, electromagnetic means for actuating said control valves, a source of current, a manually operated switch for controlling the supply of current from said source to said electromagnetic means, and means responsive to the pressure of the gas supply for governing the connection of said control valves to said gas supply.

SIGWART RUPPEL.

CERTIFICATE OF CORRECTION.

Patent No. 1,944,846.  January 23, 1934.

SIGWART RUPPEL.

It is hereby certified that error appears in the printed specification of the above numbered patent requiring correction as follows: Page 8, line 125, claim 14, for "manually" read normally; and that the said Letters Patent should be read with this correction therein that the same may conform to the record of the case in the Patent Office.

Signed and sealed this 6th day of March, A. D. 1934.

F. M. Hopkins (Seal)  Acting Commissioner of Patents.